United States Patent
Jallade

(10) Patent No.: US 8,061,659 B2
(45) Date of Patent: Nov. 22, 2011

(54) METHOD FOR DETECTING COMPLETE DRAINING OF A PROPELLANT TANK AND FOR PROPELLANT MANAGEMENT ON BOARD A SATELLITE

(75) Inventor: Sophie Martine Jallade, Castanet Tolosan (FR)

(73) Assignee: Astrium SAS, Paris (FR)

( * ) Notice: Subject to any disclaimer, the term of this patent is extended or adjusted under 35 U.S.C. 154(b) by 814 days.

(21) Appl. No.: 11/570,318

(22) PCT Filed: May 31, 2005

(86) PCT No.: PCT/FR2005/001331
§ 371 (c)(1),
(2), (4) Date: Nov. 19, 2007

(87) PCT Pub. No.: WO2006/005833
PCT Pub. Date: Jan. 19, 2006

(65) Prior Publication Data
US 2008/0142639 A1 Jun. 19, 2008

(30) Foreign Application Priority Data
Jun. 10, 2004 (FR) ..................................... 04 06282

(51) Int. Cl.
*B64G 1/40* (2006.01)
(52) U.S. Cl. .................................. 244/172.2; 137/154
(58) Field of Classification Search ............... 244/172.2, 244/172.3, 135 C; 137/154
See application file for complete search history.

(56) References Cited

U.S. PATENT DOCUMENTS

| 4,923,152 | A | | 5/1990 | Barkats |
| 5,027,597 | A | * | 7/1991 | Soeffker et al. .................. 60/243 |
| 5,064,153 | A | * | 11/1991 | Gindre et al. ............... 244/172.2 |
| 5,071,093 | A | | 12/1991 | Perdu |
| 5,284,309 | A | * | 2/1994 | Salvatore et al. ......... 244/135 C |
| 5,880,356 | A | * | 3/1999 | Delepierre-Massue et al. .. 73/37 |

FOREIGN PATENT DOCUMENTS

| GB | 2177510 | 1/1987 |
| JP | 2001082249 | 9/1999 |

* cited by examiner

*Primary Examiner* — Joshua Michener
*Assistant Examiner* — Brian M O'Hara
(74) *Attorney, Agent, or Firm* — Patzik, Frank & Samotny Ltd.

(57) ABSTRACT

Using at least one pressure sensor in an emptying pipe or a feed pipe between emptying valves at the outlets from tanks and feed valves for feeding nozzles, to detect the pressure waves that result form opening and closing a feed valve, and then following operation of said valve, detecting the damping or disappearance of the pressure waves, indicating that the transition between the liquid propellant component and the pressurization gas is going past said pressure sensor, and thus that the tank is completely empty. This detection of complete emptying is a step in a method of managing propellant that makes it possible to allocate the remaining propellant to a residual lifetime for the satellite in orbit and/or to re-orbiting or de-orbiting the satellite.

12 Claims, 1 Drawing Sheet

METHOD FOR DETECTING COMPLETE DRAINING OF A PROPELLANT TANK AND FOR PROPELLANT MANAGEMENT ON BOARD A SATELLITE

FIELD OF THE INVENTION

The present invention relates to a method of detecting the complete emptying of at least one surface tension tank for liquid propellant on board an artificial satellite, in particular a geosynchronous or geostationary satellite, of the type in which the propellant tank is connected via an emptying pipe having a tank-emptying valve mounted therein, to at least one pipe for feeding a nozzle or a plurality of nozzles within a satellite propulsion system and dedicated to controlling the attitude and/or the orbit of the satellite, in which pipe there is mounted a nozzle-feed valve that is controlled to open and close intermittently in order to actuate said nozzle or said plurality of nozzles intermittently.

The invention also relates to a method of managing propellant on board an artificial satellite in orbit, which method includes an essential step constituted by the method of the invention for detecting the complete emptying of at least one surface tension tank for a liquid propellant, since detecting the complete emptying of a propellant tank constitutes a parameter that is decisive in implementing strategies for controlling the feeding of the nozzles or pluralities of nozzles with residual quantities of propellant in one or more other tanks during the end of the operational lifetime of the satellite and/or for re-orbiting or de-orbiting the satellite onto a graveyard orbit.

BACKGROUND OF THE INVENTION

De-orbiting or re-orbiting artificial satellites at the end of their operational lifetime is an operation that is tending to be applied systematically, for two major reasons:
- with geostationary satellites, the geostationary orbit can receive only a limited number of satellites occupying positions that are predefined and allocated by the International Telecommunication Union (ITU), and it is desirable or even necessary to release those positions at the end of the working lifetime of a satellite so that these positions can be reused;
- for satellites in low orbit, the number of satellites is increasing and in the shorter or longer term they present risks of colliding with one another or, which would be much more serious, with an inhabited space station, and rules are currently being drawn up for limiting the orbiting lifetime of such satellites once they have reached the end of their mission, with one recommendation that is widely accepted at present being a lifetime limited to 25 years.

A satellite is generally de-orbited or re-orbited by using thrust from at least one of two nozzles or pluralities of nozzles that were previously used for controlling the orbit and/or the attitude of the satellite while it was in operation, after which the residual quantity of propellant, or a fraction of said residual quantity, is used to feed said nozzles or pluralities of nozzles so as to perform said de-orbiting or re-orbiting maneuver.

For a commercial satellite, and in particular for a telecommunications satellite in geostationary orbit, the advantage in prolonging the operating period of the satellite as much as possible can be seen immediately. The operator has every interest in triggering the change-of-orbit sequence as late as possible, while still remaining compatible with the minimum requirements in terms of propellant needed for feeding the nozzles or pluralities of nozzles so as to ensure the satellite is put onto a "graveyard" orbit.

SUMMARY OF THE INVENTION

To this end, the invention proposes firstly a method that is simple and reliable for detecting the complete emptying of at least one surface tension tank for a liquid propellant in an artificial satellite, and secondly a method that includes said method of detecting the complete emptying of a propellant tank as an essential step in managing the propellant on board the satellite, and in particular for monitoring the propellant component(s) in order to optimize use of the propellant component(s) remaining in the tanks of the satellite so as to delay as long as possible the implementation of the sequence for de-orbiting or re-orbiting the satellite.

The invention thus proposes a method of detecting the complete emptying of at least one propellant tank and a method of managing propellant on board an artificial satellite in orbit, which methods are particularly adapted to making optimum use of propellant at the end of the operating lifetime of a satellite in orbit and/or for performing a maneuver of de-orbiting or re-orbiting the satellite at the end of its lifetime.

To this end, the method of detecting the complete emptying of at least one surface tension tank for liquid propellant on board an artificial satellite of the type in which the tank is connected to at least one nozzle or plurality of nozzles in the manner described above, is characterized in that it comprises at least the steps consisting in using at least one pressure sensor mounted in the emptying or feed pipe between said emptying and feed valves to detect the pressure oscillation waves (hammering) that result from opening and closing said feed valve and that travel along the feed and emptying pipes from the downstream feed valve towards said upstream tank, and then, following operation of said feed valve, in detecting the at least partial damping, if not disappearance, of said pressure oscillation waves indicating that the transition between the liquid propellant and a propellant pressurization gas (such as helium used for pressurizing the propellant in the tank) going past the pressure sensor, and thus indicating that the tank is completely empty.

It is thus possible to detect and monitor the emptying of liquid propellant from tanks on board the satellite, the principle of such detection relying on the use of at least one pressure sensor in the line at the outlet from the tank for feeding the thrusters with propellant, which measurement as performed by the pressure sensor(s) serving in particular to define the instant at which the transition between the liquid propellant and the pressurization gas passes in the vicinity of a pressure sensor, such that on the basis of this information it is possible to anticipate the arrival of bubbles in the thrusters having nozzles for controlling attitude and/or orbit.

When there is only one tank per propellant component, given that it is generally necessary to have two components, i.e. a fuel and an oxidizer, the above information derived from the measurements of the pressure sensor(s) serves in particular to avoid losing control of the satellite at the end of its life by lack of a propellant component in the thrusters, so as to ensure that forthcoming operations can be performed. In particular, this makes it possible to perform the satellite decommissioning operations with the satellite in its nominal alignment under manual remote control with ensured visibility from the ground.

More precisely, when the satellite has a single surface tension tank for liquid propellant per propellant component, and when that tank is connected by an emptying pipe having a tank-emptying valve mounted therein to two feed pipes each of which has a respective feed valve mounted therein for feeding a respective nozzle or plurality of nozzles of the propulsion system of the satellite for controlling satellite attitude and/or orbit, the propellant management method of the invention is characterized in that it comprises at least the steps consisting:

in feeding one or the other of the two nozzles or pluralities of nozzles intermittently with propellant component by causing one or other of the feed valves to open and close, while said tank-emptying valve is open; and in monitoring the emptying of propellant component from said tank, the method being characterized in that it also comprises at least one step consisting in detecting the complete emptying of said tank by the method of the invention for detecting the complete emptying of at least one tank as defined above, and on the basis of a signal from at least one pressure sensor in detecting that said tank has emptied completely, in causing the current maneuver to be stopped, and in closing the feed valve of said nozzle or plurality of nozzles actuated during said maneuver, in order to make forthcoming operations safe, and in performing operations for decommissioning the satellite in nominal alignment by manual remote control with ensured ground visibility.

In contrast, when there are at least two tanks per propellant component, the above information relating to the instant the transition between the liquid propellant and the pressurization gas goes past a pressure sensor makes it possible firstly to switch the propellant feed to the nozzles or pluralities of nozzles from an empty tank to a second tank, while avoiding losing control of the satellite due to lack of propellant at the thrusters, and secondly to make use of the propellant contained in the second tank for changing the orbit of the satellite, the uncertainty concerning knowledge about the quantity of propellant that remains usable then being restricted to the second tank, and possibly to any additional tanks, since the first tank for this propellant component is completely empty.

More precisely, when the satellite includes, for at least one propellant component, two surface tension tanks for liquid propellant, each connected by a respective emptying pipe having a respective emptying valve connected therein to the upstream end of a common pipe having a downstream end connected in parallel to each of two nozzles or pluralities of nozzles of a propulsion system of the satellite for controlling the attitude and/or the orbit of the satellite, via respective feed pipes each having a respective feed valve mounted therein for feeding the corresponding nozzle or plurality of nozzles, the method of managing propellant on board the satellite in orbit comprises at least the steps consisting:

in intermittently feeding one or the other of the two nozzles or pluralities of nozzles with propellant by causing one or the other of the feed valves to open and close, while one of the emptying valves is open and the other closed, so that the propellant is emptied from at least one of the two tanks;

in closing a previously-open emptying valve and opening the previously-closed valve, to switch over the feed to the nozzles or pluralities of nozzles from the previously-emptied tank to the other tank; and in repeating, depending on requirements for controlling the attitude and/or the orbit of the satellite, the two preceding steps;

the method being characterized in that it further comprises at least the steps consisting:

in monitoring the emptying of liquid propellant from the two tanks, and in detecting the complete emptying of a first tank by the method of the invention for detecting the complete emptying of at least one liquid propellant tank as described above, and then in causing the current maneuver to be stopped and switching the liquid propellant feed from the first tank which is empty, to the second tank by appropriately opening the emptying valve of said second tank.

In this second configuration, the propellant management method of the invention advantageously further consists in monitoring the emptying of two tanks and in detecting complete emptying of a first tank using at least one downstream pressure sensor mounted in said common pipe, and/or at least one upstream pressure sensor mounted in each of the two emptying pipes between the upstream end of the common pipe and the corresponding tank-emptying valve.

Under such circumstances, if detection of complete emptying of the first tank is provided by an upstream pressure sensor before the propellant pressurization gas reaches said common pipe, the method also and advantageously comprises, after causing the current maneuver to be stopped, restarting at least one maneuver by actuating one or the other of the two nozzles or pluralities of nozzles after switching over their feed to the second tank for the same propellant component.

In contrast, if complete emptying of the first tank is detected by a downstream pressure sensor, the propellant management method of the invention further and advantageously comprises, after stopping the current maneuver, steps consisting in switching over the feed of said nozzle or plurality of nozzles in action during the detection of complete emptying to the second tank for the same propellant component, until a disturbance in the operation of said nozzle or plurality of nozzles is detected, and then in causing the feed valve for said nozzle or plurality of nozzles to close and the feed valve or the other nozzle or plurality of nozzles to open, in order or compensate for the consequences of said disturbance on the attitude and/or orbit of the satellite, and then in controlling any subsequent maneuver by feeding said other nozzle or plurality of nozzles from the second tank for the same propellant component.

Under such circumstances, detecting said disturbance in the operation of the nozzle or the plurality of nozzles in action on detecting the complete emptying of the first tank is advantageously performed with the help of a criterion for satellite attitude misalignment, and in recovering alignment by acting on the other nozzle or plurality of nozzles, while being fed by the second tank for the same propellant component.

The satellite attitude misalignment criterion can be determined in numerous different ways, however in an implementation that is effective in practice and specific to the invention, it consists in using a misalignment threshold that satisfies the following constraints:

being greater than the misalignments usually encountered while maneuvering so as to avoid, prior to detecting complete emptying of the first tank, any untimely triggering of the operations planned for after detecting said disturbance;

being less than an acceptable threshold for a mission if a mission is being executed; and being less than a threshold for triggering the reconfiguration mode associated with fail-soft operation, taking a margin so as to enable the attitude of the satellite to be recovered by actuating the other nozzle or plurality of nozzles.

In the various implementations of the propellant management method of the invention, the step of causing the current maneuver to stop may advantageously be implemented on the basis of a signal delivered by a pressure sensor and/or with the help of a criterion derived from an analysis of information given by at least one pressure sensor.

When the satellite is fitted with a conventional propulsion system using two propellant components, each contained in two surface tension tanks for liquid propellant, forming two pairs of associated tanks each comprising one tank of a first propellant component and one tank of a second propellant component, one or the other of the two nozzles or pluralities of nozzles being fed with propellant component simultaneously by the two tanks of one or the other pairs of associated tanks, the propellant management method of the invention is advantageously such that after detecting complete emptying of a first tank of a first propellant component, stopping the current maneuver, switching the feed to the second tank of the first propellant component, and optionally switching propulsion to one of the nozzles or pluralities of nozzles after the other nozzle or plurality of nozzles has been polluted by the arrival of a gas for pressurizing the first propellant component as a result of the first tank for the first propellant component becoming completely empty, it consists in feeding one or the other of the two nozzles or pluralities of nozzles or only the nozzle or nozzles not polluted by the pressurization gas, from the second tank of the first propellant component and simultaneously from one or the other of the two tanks of the second propellant component.

In the various configurations in which the installation for feeding the thrusters with propellant comprises, for at least one propellant component, two surface tension tanks for liquid propellant, as described above, the propellant management method of the invention may advantageously further consist, after detecting complete emptying of a first tank of a propellant component and switching the feed of one and/or the other of the nozzles or pluralities of nozzles to the second tank of the same propellant component, and optionally after restoring the attitude of the satellite, it consists in allocating the residual quantities of propellant in the tanks to a residual lifetime for the satellite in orbit and/or to changing the satellite's orbit to a graveyard orbit.

Finally, and advantageously, to obtain very fine detection by the method of the invention for detecting complete emptying of a tank, the method may further consist in sampling the signal from at least one pressure sensor at a frequency substantially equal to half the actuating frequency of a nozzle or a plurality of nozzles in order to detect oscillations in pressure following the opening and closing of the corresponding feed valve.

Other characteristics and advantages of the invention appear from the description given below in non-limiting manner of an embodiment that is described with reference to the accompanying drawing, comprising a single diagrammatic FIGURE showing a satellite propulsion subsystem having two tanks for the same propellant component for feeding selectively one or the other of two pluralities of satellite attitude and/or orbit control nozzles, it being understood that these pluralities of nozzles are also fed with a second propellant component contained in two other tanks by a circuit mirroring the circuit of the sole accompanying FIGURE.

BRIEF DESCRIPTION OF THE DRAWING

The sole FIGURE is a diagrammatic FIGURE showing a satellite propulsion subsystem.

DETAILED DESCRIPTION OF THE INVENTION

Figure 1:
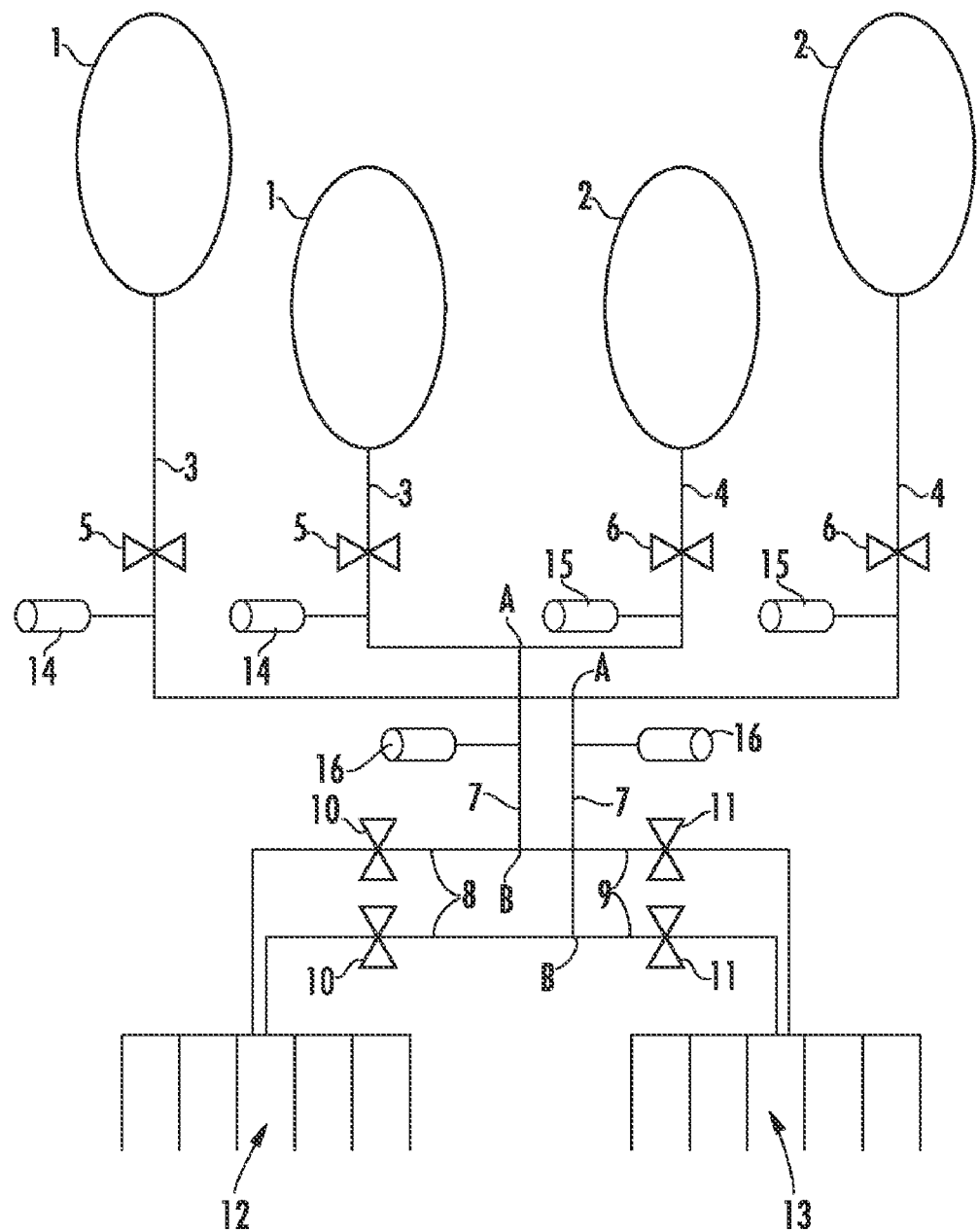

Each of the two propulsion subsystems has two tanks containing the same propellant component which is a fuel in one subsystem and an oxidizer in the other, and it is assumed that the sole FIGURE shows that one of the two subsystems in which one of the two tanks will be the first of the four tanks to become completely empty in the working lifetime of a satellite in orbit.

This propulsion subsystem thus comprises two tanks 1 and 2 both containing the same liquid propellant component presenting surface tension, e.g. monomethyl hydrazine or nitrogen tetroxide, together with a pressurizing gas such as helium that puts the propellant component in the tanks 1 and 2 under pressure in order to feed the liquid component to a respective emptying pipe 3 or 4 when a respective valve 5 or 6 for emptying the respective tank 1 or 2 and mounted in the respective emptying pipe 3 or 4 is caused to open. The downstream ends of the emptying pipes 3 and 4 meet at an upstream end point A of a common pipe 7 having a downstream point B that is in communication with the upstream ends of two feed pipes 8 and 9, each having a feed valve 10 or 11 mounted therein so that on being caused to open and close they enable propellant to be fed intermittently and during alternating periods to a first group and to a second group of satellite attitude and/or orbit control nozzles 12 or 13 at the respective downstream ends of the feed pipes 8 and 9.

At least one upstream pressure sensor, such as 14 or 15, is mounted on each of the emptying pipes 3 and 4 between the corresponding emptying valve 5 or 6 and the upstream end A of the common pipe 7, and preferably close to the downstream end of the corresponding emptying valve 5 or 6.

Similarly, at least one downstream pressure sensor 16 is mounted on the common pipe 7. The emptying valves 5 and 6 and the feed valves 10 and 11 are solenoid valves disposed respectively in the emptying pipes 3 and 4 and the feed pipes 8 and 9.

The liquid propellant is captured at the outlet from each tank 1 or 2 by a capillary device such as a sponge (not shown) that enables the emptying pipes 3 and 4 to be supplied with liquid propellant until no more can be captured by the capillary device, all that remains then being static liquid residues in the tank 1 or 2. Complete emptying of a tank 1 or 2 thus leads to a transition between liquid propellant and the pressurized gas passing along the corresponding emptying pipe 3 or 4, and then along the common pipe 7, with the passage of this transition being detected by one of the two upstream pressure sensors 14 and 15 and/or by the downstream pressure sensor 16.

When the group of nozzles 12 or 13 is put into action, and the nozzles 12 or 13 are thus consuming liquid propellant coming from the tank 1 or 2, the successive opening and closing of the feed valve 10 or 11 (given that the groups of nozzles 12 and 13 are actuated intermittently) lead to pressure oscillation being created that generates pressure waves known as "hammering" that travel along the feed pipe 8 or 9, the common pipe 7, and the emptying pipe 3 or 4 from downstream to upstream, and depending on which one of the feed valves 10 and 11 is successively opened and closed while the other one remains closed, and which of the emptying valves 5 and 6 is open while the other one is closed. These pressure oscillation waves are detected at the downstream sensor 6 and at the upstream pressure sensor 14 or 15 depending on which one of the emptying valves 5 and 6 is open while the other one is closed, in the form of pressure variations of the order of 0.05 megapascals (MPa) in pressures of the order of 1 MPa, for example, these pressure variations being perceptible providing the signal from the pressure sensor 16, 14, or 15 is sampled properly. Thus, a pressure sensor sampling frequency equal to half the frequency at which the nozzles 12 or 13 are actuated can suffice for observing this phenomenon.

However, when bubbles, essentially of pressurization gas, are present in the feed line constituted by one of the emptying pipes 3 and 4, the common pipe 7, and one of the feed pipes 8 and 9, the damping effect of the bubbles attenuates these pressure variations very strongly and can even cause it to disappear, thus making it possible to define the instant at which bubbles travel past an upstream pressure sensor 14 or 15 or the downstream pressure sensor 16, thereby indicating that the tank 1 or 2 feeding the nozzles 12 or 13 is empty.

This signal, indicating that the tank 1 or 2 being used during a maneuver is completely empty triggers a command to stop the maneuver.

For a propulsion system having two tanks of the same propellant component, as is the case for the system in the generic layout of the sole FIGURE, this stopping of the current maneuver when one of the tanks 1 or 2 becomes empty ought to take place, where possible, before the bubbles of gas penetrate into the common pipe 7, i.e. before they reach the point A. That is why it is advantageous to have upstream pressure sensors 14 and 15 situated as far as possible upstream from the point A. The maneuvers of the satellite can then be restarted after switching the feed to the nozzles 12 or 13 over to the other tank 2 or 1, i.e. to the tank whose emptying valve 6 or 5 was closed when it was found that the first tank was completely empty, with this changeover of feed tank taking place so as to ensure that the propellant component available for the nozzles 12 or 13 does not containing any bubbles coming from the now completely empty first tank. This constraint requires the circuit for detecting that a tank is completely empty to react very quickly and cause the feed valves 10 and 11 to close in order to be able to interrupt the current maneuver quickly enough.

However, when the interruption of the current maneuver takes place too slowly, and bubbles of gas from the completely empty tank penetrate into the common pipe 7. This can also happen if the upstream pressure sensors 14 and 15 are faulty, or indeed if the system includes only at least one downstream pressure sensor such as 16. Under such circumstances, the strategy proposed for managing propellant is to use the redundancy provided by the presence of two groups of nozzles 12 and 13, after changing over the feed from the tank that is completely empty to the other tank.

For example, assume that a first maneuver during which the nozzles 12 are fed with propellant by the tank 1 (valves 5 and 10 open and valves 6 and 11 closed), is interrupted by a pressure criterion resulting from a signal from the downstream pressure sensor 16, or even from the upstream pressure sensor 14 if the detection and control circuit is of relatively limited reaction speed, then bubbles coming from the tank 1 are detected as reaching the common pipe 7. The following maneuver, or second maneuver, is then performed by feeding the same nozzles 12 form the other tank 2 that still contains liquid propellant, i.e. by opening the previously-closed emptying valve 6, while keeping the feed valves 10 and 11 respectively open and closed. This second maneuver is then interrupted by the loss of performance of the nozzles 12 on the arrival at the nozzles 12 of the bubbles from the tank 1 that managed to penetrate into the common pipe 7 before the first maneuver was interrupted. The second maneuver is then interrupted on the basis of a criterion based on satellite misalignment, resulting from the above-mentioned loss of performance of the nozzles 12. The attitude of the satellite is then immediately recovered by actuating the redundant nozzles, i.e. the nozzles 13, and feeding them from the tank 2, by causing the feed valve 11 to open.

The misalignment criterion for controlling the stopping of the second maneuver is adjusted on a threshold that is quite small so as to disturb the ongoing satellite mission little and avoid the satellite going into fail-soft mode or survival mode. The following maneuvers are performed by feeding the nozzles 13 from the tank 2. For this purpose, the feed line constituted by the emptying pipe 4, the common pipe 7, and the feed pipe 9 is a feed line filled with liquid propellant having no bubbles, insofar as the volume of the common pipe 7 between the points A and B is smaller than the volume of the feed pipe 8 between the point B and the nozzles 12 of the group that suffered the above-mentioned loss of performance on the bubbles coming from the tank 1 reaching the nozzles 12. In this configuration, the bubbles are discharged by the nozzles 12 or trapped between the downstream end (at point B) of the common pipe 7 and the nozzles 12. In order to limit any propagation or displacement of the bubbles in the long term, it is possible and preferable to close the feed valve 10 in the feed pipe 8 as a preventative measure.

It will be understood that implementing the method of the invention for detecting complete emptying of a tank, and thus any propellant measurement method that includes it as one of its steps, requires at least one surface tension such as 1 or 2, and at least one pressure sensor such as 14, 15, or 16 that is oversampled at the outlet from the tank, making it possible to detect the damping or the disappearance of pressure oscillations caused in a line for feeding nozzles such as 12 or 13 with a liquid propellant by the opening and closing operations of a valve such as 10 or 11 for feeding said nozzles 12 or 13, and enabling the satellite maneuver plan to be stopped.

The reactivity of the apparatus shown in FIG. 1 and implementation of the methods of the invention can be improved by using control software for the apparatus that enables the emptying of a tank such as 1 or 2 to be interrupted during a maneuver, e.g. on the basis of one and/or the other of the following two criteria.

The first criterion can come from analysis of the data provided by at least one pressure sensor such as 14 or 15 and/or 16, e.g. as described above during the first maneuver, during which the group of nozzles 12 is fed from the tank 1. The reaction time must enable the maneuver to be stopped before bubbles reach the upstream end of the common pipe 7, i.e. the point A, as a result of detecting damping or disappearance of pressure waves associated with the interface between the liquid propellant component and the bubbles of gas going past the upstream pressure sensor 14 or before the bubbles reach the nozzles 12, or preferably, no further downstream than the downstream end, point B, of the common pipe 7, as the result of detecting the damping or disappearance of pressure waves by the upstream pressure sensor 14 or the downstream pressure sensor 16. After the maneuver has been stopped in this way, a change in the group of nozzles being actuated (nozzles 13 instead of nozzles 12 in this example) is not proposed so long as bubble detection takes place well upstream, for example by the upstream pressure sensor 14 on its own, and without the downstream pressure sensor 16 detecting any damping or disappearance of said pressure waves.

The second criterion may be an attitude misalignment criterion, e.g. as for the second maneuver described above, in which the group of nozzles 12 is fed from the tank 2. The software implementing the propellant management method then causes the group of nozzles in use to be changed, in this case to the nozzles 13, to benefit from bubble-free propellant and to recover the alignment of the satellite. The control software then ensures that the misalignment threshold used for the above-described control satisfies at least one of the following three constraints.

The first constraint is that the misalignment threshold must be greater than the amount of misalignment commonly encountered while maneuvering the satellite, so as to avoid triggering the above-described control in untimely manner without any bubbles being present, and thus before complete emptying of a tank has been detected.

The second constraint is that this misalignment threshold should be lower than an acceptance threshold for any mission the satellite is currently executing.

The third constraint is that the misalignment threshold should be less than the threshold for triggering the reconfiguration mode of the satellite that is associated with fail-soft conditions, by taking a margin in order to enable the attitude of the satellite to be recovered with the redundant group of nozzles (e.g. the nozzles 13 in the above-described example).

The above-described methods of detecting the complete emptying of a tank of liquid propellant component and of managing propellant on board a satellite are particularly advantageous for managing tanks for two types of propellant component in a two-liquid propulsion satellite at the end of its lifetime, having four tanks with two per type of component, as mentioned above for the sole FIGURE, which shows only the two tanks for one of the components (fuel or oxidizer), while two other tanks for the other component can also feed the two groups of nozzles 12 and 13 via emptying pipes analogous to the pipes 3 and 4, with emptying valves analogous to the valves 5 and 6, and having upstream pressure sensors such as 14 and 15 mounted therein, with a common pipe such as 7 having at least one downstream pressure sensor such as 16 mounted therein, and with feed pipes such as 8 and 9 having feed valves such as 10 and 11 respectively mounted therein.

Under such circumstances, during the last years of the working lifetime of the satellite in orbit, and before proceeding to re-orbit or de-orbit the satellite, known methods for estimating the amount of propellant remaining in the tanks serve to identity which component is in excess (oxidizer or fuel). The quantity of the excess component, that will not be usable because there is not enough of the other component on board the satellite to consume the excess component, is referred to as the "dynamic residual". Since the performance of thrusters with nozzles such as 12 and 13 using a single propellant component is considered as being insufficient, such "dynamic residual" propellant is not taken into account in propellant budgets.

The first step in managing tanks at the end of a satellite's lifetime thus consists in identifying which component is in excess. By way of example, it is assumed that it is the propellant component stored in the two tanks for the other component not shown in the sole FIGURE, and referred to as the third tank and the fourth tank.

In order to select the tanks for feeding one or the other of the groups of nozzles 12 and 13 during the last maneuvers of the satellite, it is proposed to maintain the third and fourth tanks at identical levels of content depending on the estimates of remaining propellant.

Similarly, by selecting tanks during the last maneuvers, it is proposed for the tanks 1 and 2, to maintain the tank 1 filled with a smaller amount than the tank 2 of the quantity of propellant component needed for re-orbiting or de-orbiting the satellite, depending on the estimates of propellant remaining.

The method as defined above for detecting complete emptying of a tank is then implemented, and when complete emptying of the tank 1 is detected, the current maneuver is interrupted and the end of the satellite's lifetime is declared.

The feed to the nozzles 12 or 13 from the redundant tank 2 is then changed over in application of the above-described method, and the satellite is re-orbited or de-orbited by feeding the nozzles from the tank 2 with one of the propellant components and by feeding the other component in alternation from the tanks 3 and 4 that have been maintained at substantially identical levels.

It should be observed that the method of changing over feed of one of the propellant components from one tank in which complete emptying has been detected to the other tank containing the same component, as described above, is not applicable a second time to the third and fourth tanks and therefore cannot be renewed, since it takes advantage of the redundancy between the groups of nozzles 12 and 13 in order to be able to change over the feed from one tank to the other. Detecting complete emptying of one or other of the third and fourth tanks would not enable the feed of the second component to be switched over to the other one of the third and fourth tanks, without losing control of the satellite on switching feed to the apparently redundant one of the third and fourth tanks, since the nozzles in one of the groups, the nozzles 12 in the above-described example, could already be contaminated by the bubbles coming from the tank 1 whose complete emptying has already been detected, so these nozzles are not usable.

Consequently, after complete emptying of a first tank of propellant component has been detected, e.g. the tank 1, and after the feed of one and/or the other of the two groups of nozzles 12 and 13 has been switched over to the second tank containing the same component, e.g. the tank 2, possibly after restoring the attitude of the satellite, the residual quantities of propellant in the tanks are allocated to a residual lifetime for the satellite in orbit and/or to re-orbiting or de-orbiting the satellite to a so-called "graveyard" orbit.

The invention claimed is:

1. A method of detecting complete emptying of a liquid propellant from at least one of two surface tension tanks in an artificial satellite, the method including:
   providing emptying pipes on board the satellite wherein each said tank is connected by a respective emptying pipe having a respective tank-emptying valve mounted therein to at least one feed pipe,
   providing each of said feed pipes with a respective feed valve mounted therein for feeding a nozzle or a plurality of nozzles in a propulsion system for controlling the attitude and/or orbit of the satellite,
   providing each of said feed pipes with at least a respective nozzle-feed valve mounted therein that is controlled to open and close intermittently enabling liquid propellant to be fed from said tank, intermittently and during alternating periods, to said nozzle or plurality of nozzles at the respective downstream ends of the feed pipes,
   detecting pressure oscillation waves that result from opening and closing said feed valve and that travel along the feed and emptying pipes from the downstream feed valve towards said upstream tank by using at least one pressure sensor mounted in the emptying pipe or the feed pipe between said emptying valve and said feed valve, and then following operation of said feed valve, detecting the at least partial damping or disappearance of said pressure oscillation waves indicating that the transition between the liquid propellant and a propellant pressurization gas has gone past the pressure sensor, and indicating that the tank is completely empty.

2. A method according to claim 1, further comprising the step of sampling the signal from at least one pressure sensor at a frequency substantially equal to half the actuating frequency of a nozzle or a plurality of nozzles in order to detect oscillations in pressure following the opening and closing of the corresponding feed valve.

3. A method of managing propellant on board an artificial satellite in orbit,
the method including providing the satellite with a single surface tension tank for liquid propellant component, said tank being connected via an emptying pipe in which there is mounted a tank-emptying valve to two feed pipes each of which has a respective feed valve mounted therein for feeding a respective nozzle or plurality of nozzles of a satellite propulsion system for controlling the attitude and/or orbit of the satellite, the method comprising at least the steps of:
feeding one or the other of the two nozzles or pluralities of nozzles intermittently with propellant component from said tank by causing one or other of the feed valves to open and close while said tank-emptying valve is open; and
monitoring the emptying of propellant component from said tank,
the method also including at least one step consisting of detecting the complete emptying of said tank by using at least one pressure sensor mounted in the emptying pipe or the feed pipes between said emptying valve and feed valves to detect pressure oscillation waves that result from opening and closing said feed valve and that travel along the feed and emptying pipes from the downstream feed valve towards said upstream tank, and then following operation of said feed valve, detecting the at least partial damping or disappearance of said pressure oscillation waves indicating that the transition between the liquid propellant and a propellant pressurization gas has gone past the pressure sensor, and indicating that the tank is completely empty, and
closing the feed valve of said nozzle or plurality of nozzles the basis of a signal from at least one pressure sensor after detecting that said tank has emptied completely in order to make forthcoming operations safe, and for performing operations for decommissioning the satellite in nominal alignment by manual remote control with ensured ground visibility.

4. A propellant management method according to claim 3, wherein the step of causing the current maneuver to stop is implemented on the basis of a signal delivered by a pressure sensor and/or with the help of a criterion derived from an analysis of information given by at least one pressure sensor.

5. A method of managing propellant on board an artificial satellite in orbit, the satellite comprising for at least one propellant component, two surface tension tanks for liquid propellant, each connected by a respective emptying pipe having a respective emptying valve connected therein to the upstream end of a common pipe having a downstream end connected in parallel to each of two nozzles or pluralities of nozzles of a propulsion system of the satellite for controlling the attitude and/or the orbit of the satellite, via respective feed pipes each having a respective feed valve mounted therein for feeding the corresponding nozzle or plurality of nozzles, the method comprising at least the steps of:
intermittently feeding one or the other of the two nozzles or pluralities of nozzles with propellant from one of said two surface tension tanks by causing one or the other of the feed valves to open and close, while one of the emptying valves is open and the other closed, so that the propellant is emptied from at least one of the two tanks;
closing a previously-open emptying valve and opening the previously-closed valve, to switch over the feed to the nozzles or pluralities of nozzles from the previously-emptied tank to the other tank; and
repeating, depending on requirements for controlling the attitude and/or the orbit of the satellite, the two preceding steps,
the method further including at least the steps of:
monitoring the emptying of liquid propellant from the two tanks, and detecting the complete emptying of a first tank by using at least one pressure sensor mounted in the emptying pipe or the feed pipe between said emptying valve and feed valves to detect pressure oscillation waves that result from opening and closing said feed valve and that travel along the feed and emptying pipes from the downstream feed valve towards said upstream tank, and then following operation of said feed valve, detecting the at least partial damping or disappearance of said pressure oscillation waves indicating that the transition between the liquid propellant and a propellant pressurization gas has gone past the pressure sensor, and thus indicating that the tank is completely empty, and then
causing the current maneuver to be stopped and switching the liquid propellant feed from the first tank which is empty, to the second tank by appropriately opening the emptying valve of said second tank.

6. A method of managing propellant according to claim 5, comprising the steps of monitoring the emptying of two tanks and detecting complete emptying of a first tank using at least one downstream pressure sensor mounted in said common pipe, and/or at least one upstream pressure sensor mounted in each of the two emptying pipes between the upstream end of the common pipe and the corresponding tank-emptying valve.

7. A propellant management system according to claim 6, wherein, if detection of complete emptying of the first tank is provided by an upstream pressure sensor before the propellant pressurization gas reaches said common pipe, the method further comprises, after causing the current maneuver to be stopped, restarting at least one maneuver by actuating one or the other of the two nozzles or pluralities of nozzles after switching over their feed to the second tank for the same propellant component.

8. A propellant management method according to claim 6, wherein, if complete emptying of the first tank is detected by a downstream pressure sensor, the method further comprises, after stopping the current maneuver, the steps comprising of switching over the feed of said nozzle or plurality of nozzles in action during the detection of complete emptying to the second tank for the same propellant component, until a disturbance in the operation of said nozzle or plurality of nozzles is detected, and then in causing the feed valve for said nozzle or plurality of nozzles to close and the feed valve or the other nozzle or plurality of nozzles to open, in order to compensate for the consequences of said disturbance on the attitude and/or orbit of the satellite, and then controlling any subsequent maneuver by feeding said other nozzle or plurality of nozzles from the second tank for the same propellant component.

9. A propellant management method according to claim 8, further comprising the steps of detecting said disturbance in the operation of the nozzle or plurality of nozzles in action during detection of complete emptying of the first tank by means of a satellite attitude misalignment criterion, and recovering the alignment by actuating the other nozzle or plurality of nozzles fed from the second tank of the same propellant component.

10. A propellant management method according to claim 9, wherein the misalignment criterion consists in using a misalignment threshold that satisfies the following constraints:

being greater than the misalignments usually encountered while maneuvering so as to avoid, prior to detecting complete emptying of the first tank, any untimely triggering of the operations planned for after detecting said disturbance;

being less than an acceptable threshold for a mission if a mission is being executed; and being less than a threshold for triggering the reconfiguration mode associated with fail-soft operation, taking a margin so as to enable the attitude of the satellite to be recovered by actuating the other nozzle or plurality of nozzles.

11. A propellant management method according to claim 5, for an artificial satellite propulsion system using two propellant components each contained in two surface tension tanks for liquid propellant, forming two pairs of associated tanks each having a tank of a first propellant component and a tank of a second propellant component, one or the other of two nozzles or pluralities of nozzles being fed with propellant components simultaneously by the two tanks of one or the other of the associated pairs of tanks, the method comprising the steps of after detecting complete emptying of a first tank of a first propellant component, stopping the current maneuver, switching the feed to the second tank of the first propellant component, and optionally switching propulsion to one of the nozzles or pluralities of nozzles after the other nozzle or plurality of nozzles has been polluted by the arrival of a gas for pressurizing the first propellant component as a result of the first tank for the first propellant component becoming completely empty, feeding one or the other of the two nozzles or pluralities of nozzles or only the nozzle or nozzles not polluted by the pressurization gas, from the second tank of the first propellant component and simultaneously from one or the other of the two tanks of the second propellant component.

12. A propellant management method according to claim 5, wherein after detecting complete emptying of a first tank of a propellant component and switching the feed of one and/or the other of the nozzles or pluralities of nozzles to the second tank of the same propellant component, and optionally after restoring the attitude of the satellite, it consists in allocating the residual quantities of propellant in the tanks to a residual lifetime for the satellite in orbit and/or to changing the satellite's orbit to a graveyard orbit.

* * * * *